United States Patent [19]

Cash

[11] Patent Number: 5,434,332
[45] Date of Patent: Jul. 18, 1995

[54] PROCESS FOR REMOVING HAZARDOUS, TOXIC, AND RADIOACTIVE WASTES FROM SOILS, SEDIMENTS, AND DEBRIS

[76] Inventor: Alan B. Cash, 7321 N. Hammond AVe., Oklahoma City, Okla. 73132

[21] Appl. No.: 161,476

[22] Filed: Dec. 6, 1993

[51] Int. Cl.⁶ .......................... G21F 9/00; B08B 3/00; B08B 3/08
[52] U.S. Cl. ........................................ 588/1; 134/2; 134/10; 585/833
[58] Field of Search ................. 423/20, 1, 2; 588/1; 134/2, 10; 585/833

[56] References Cited

U.S. PATENT DOCUMENTS

| 3,770,003 | 9/1970 | Mitterer | 423/20 |
| 4,042,671 | 7/1975 | Bowdish | 423/340 |
| 4,735,782 | 4/1988 | Wicker | 422/215 |
| 4,824,939 | 8/1989 | Simpson | 530/356 |
| 4,861,561 | 8/1989 | Pritchard | 422/116 |
| 5,069,883 | 12/1991 | Matonte | 422/209 |
| 5,128,068 | 7/1992 | Lahoda et al. | 252/626 |
| 5,205,999 | 4/1993 | Willis et al. | 423/20 |
| 5,284,991 | 2/1994 | Chu | 582/802 |
| 5,302,324 | 4/1994 | Morikawa et al. | 252/626 |
| 5,340,406 | 8/1994 | Pearson | 134/10 |

*Primary Examiner*—Ngoclan Mai

[57] ABSTRACT

A process for reducing the levels of contaminants in soils, sediments and debris comprised of an immersion of the soils, sediments and debris in a solvent, and the full drainage of the solvent from the soils, sediments and debris. The contaminants can be organic chemicals, metals, or radioactive materials. The process eliminates the effect of channeling, and allows contaminant levels to be brought to very low levels throughout the soils, sediments, and debris being processed.

19 Claims, 11 Drawing Sheets

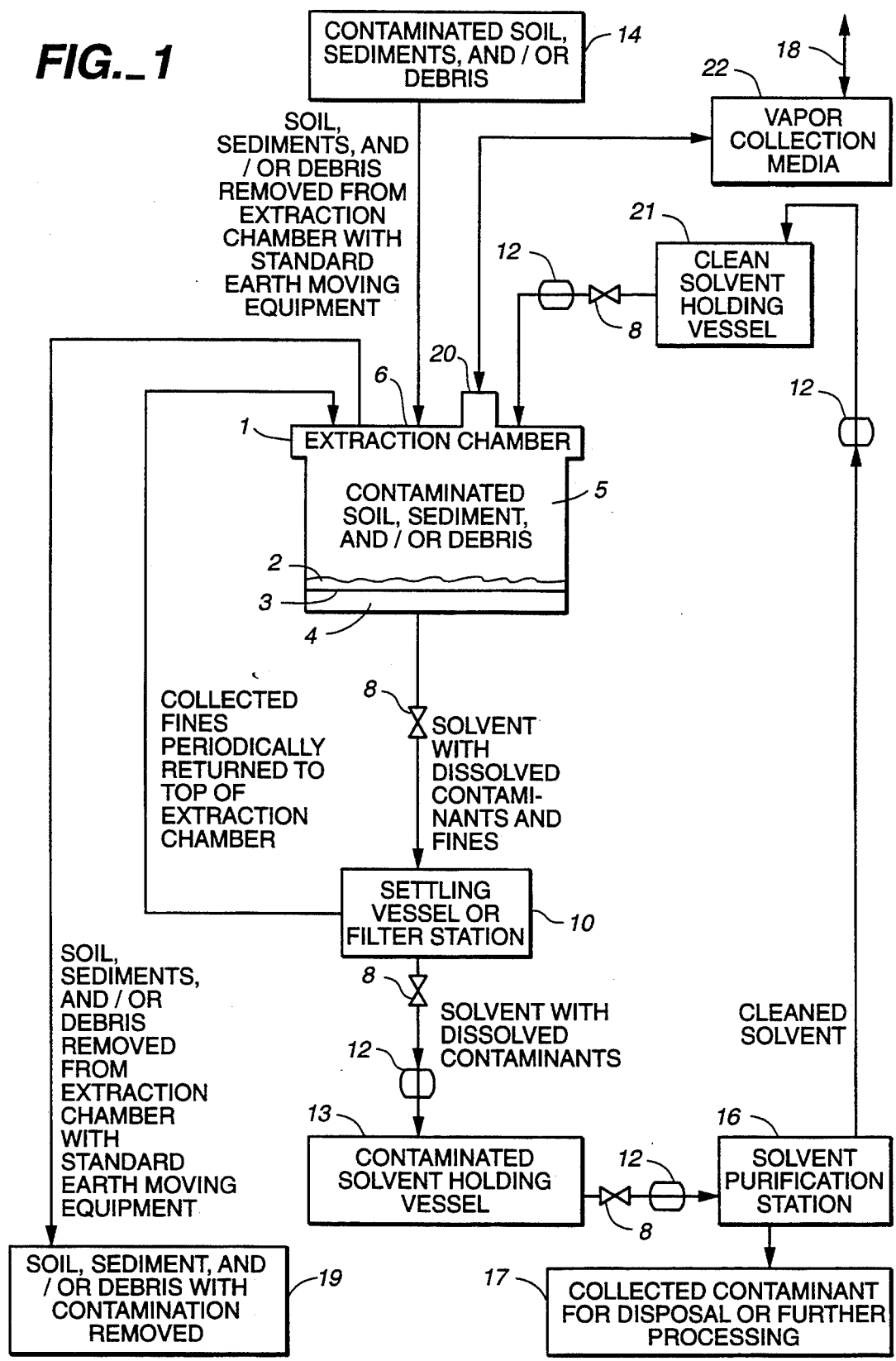
FIG._1

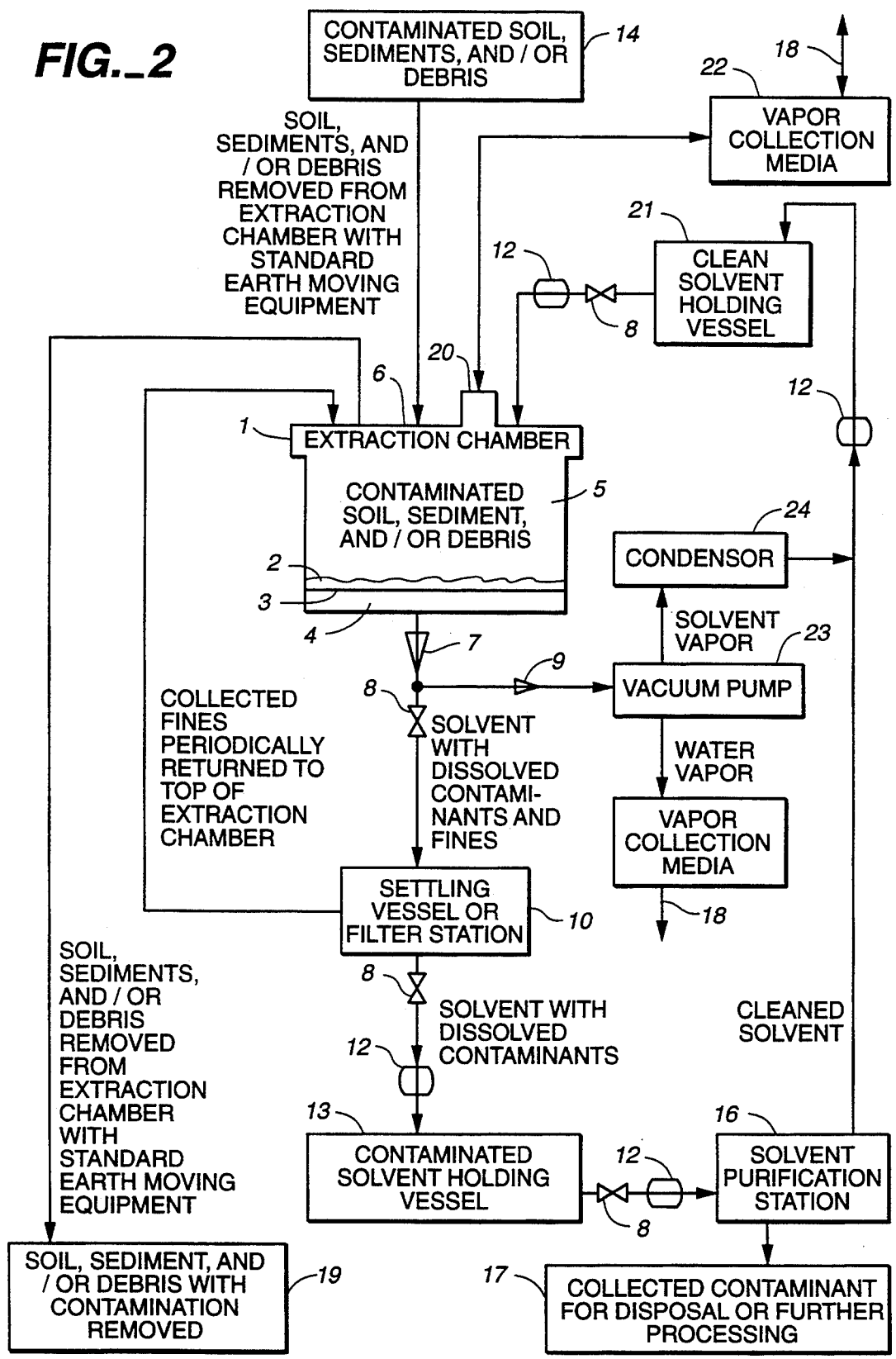
FIG._2

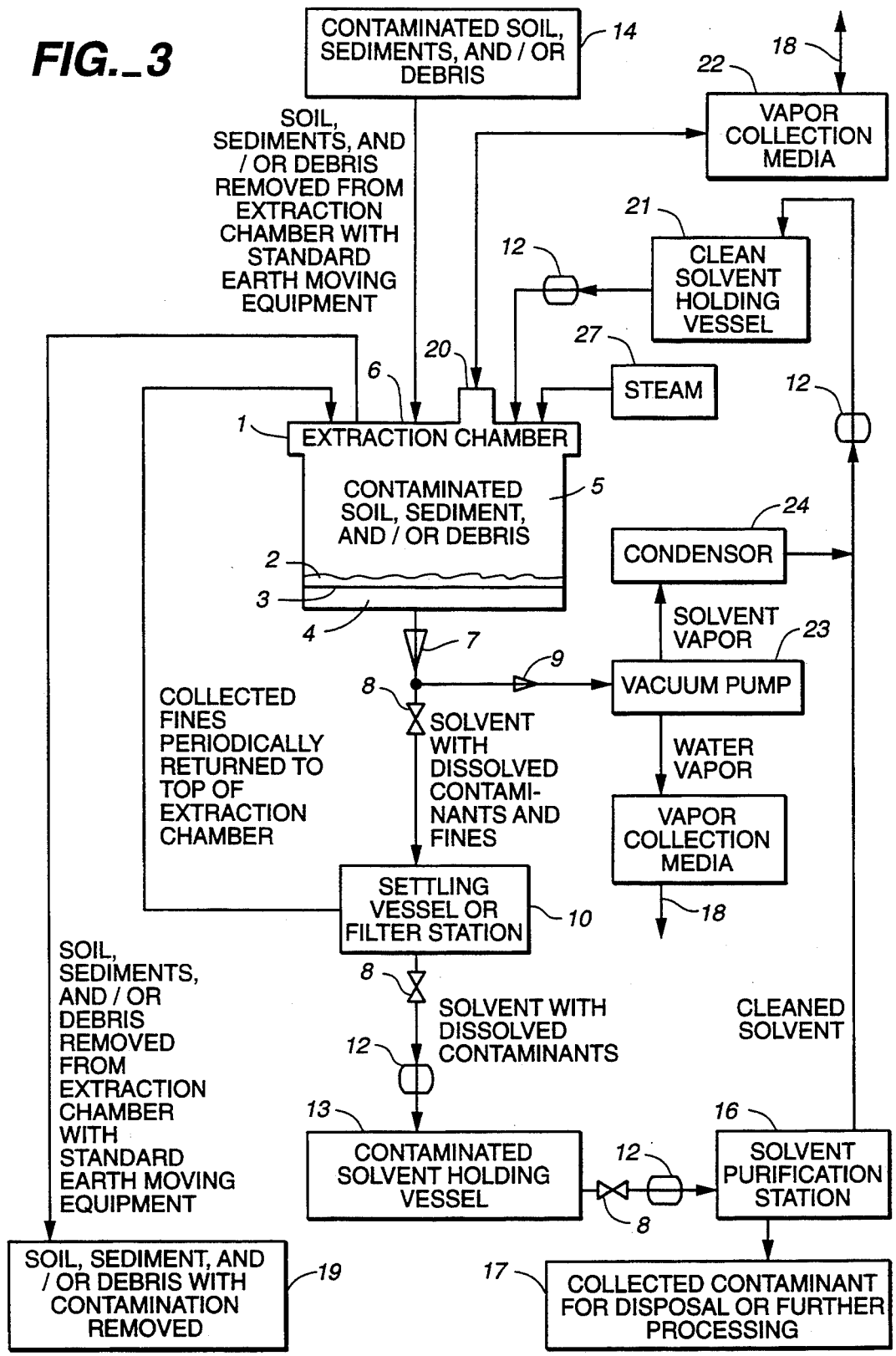
FIG._3

FIG._4
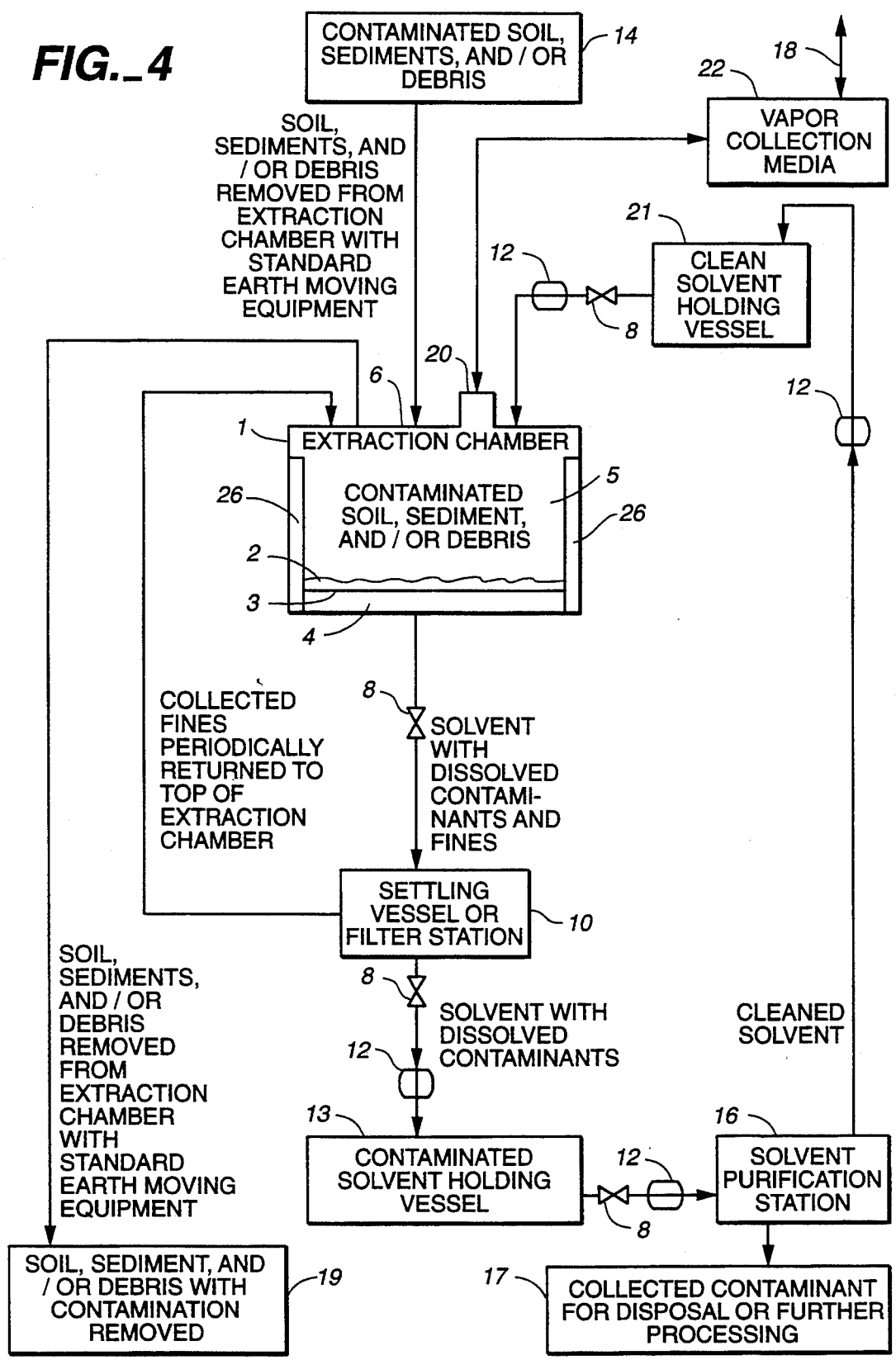

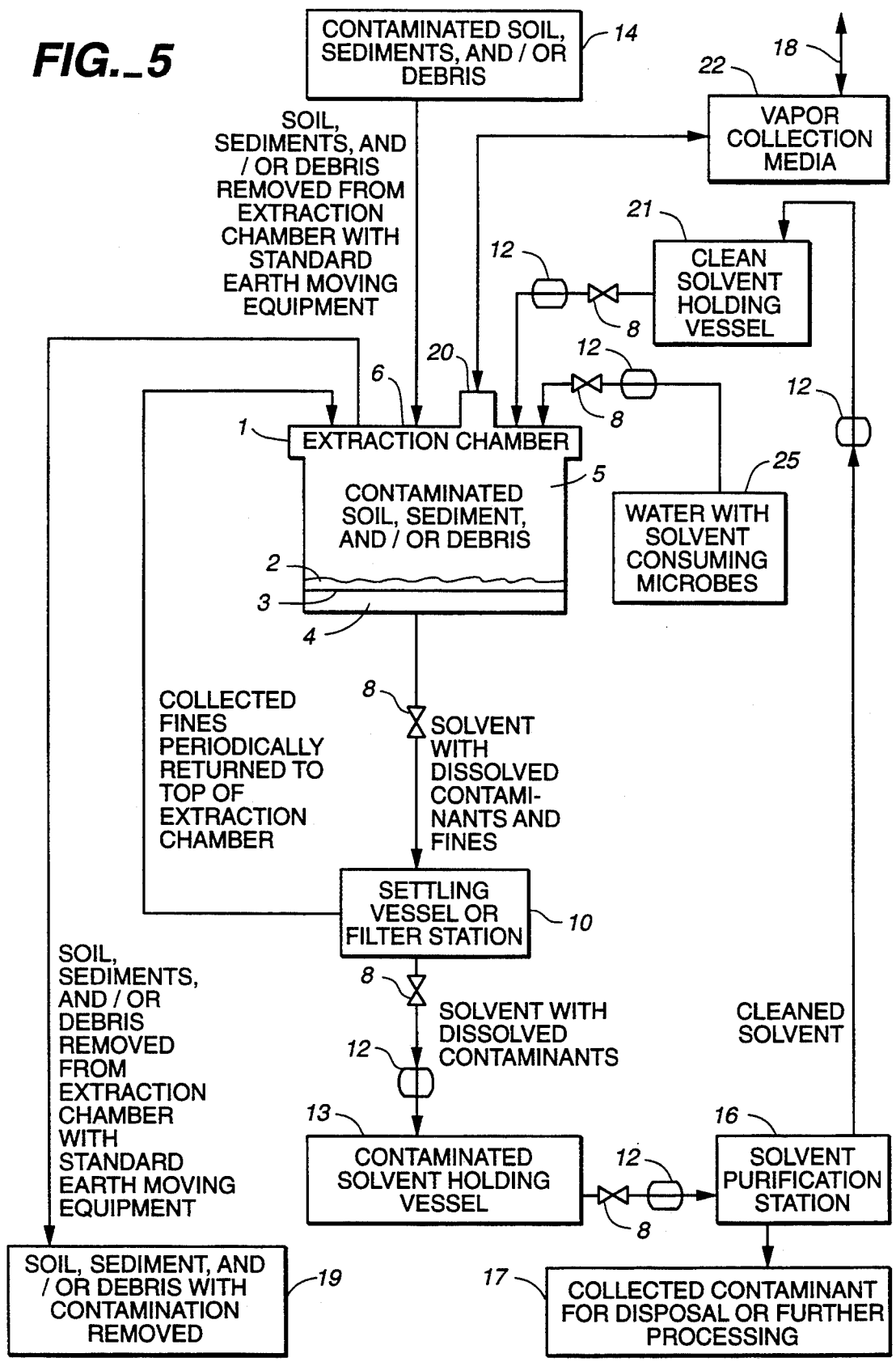
FIG._5

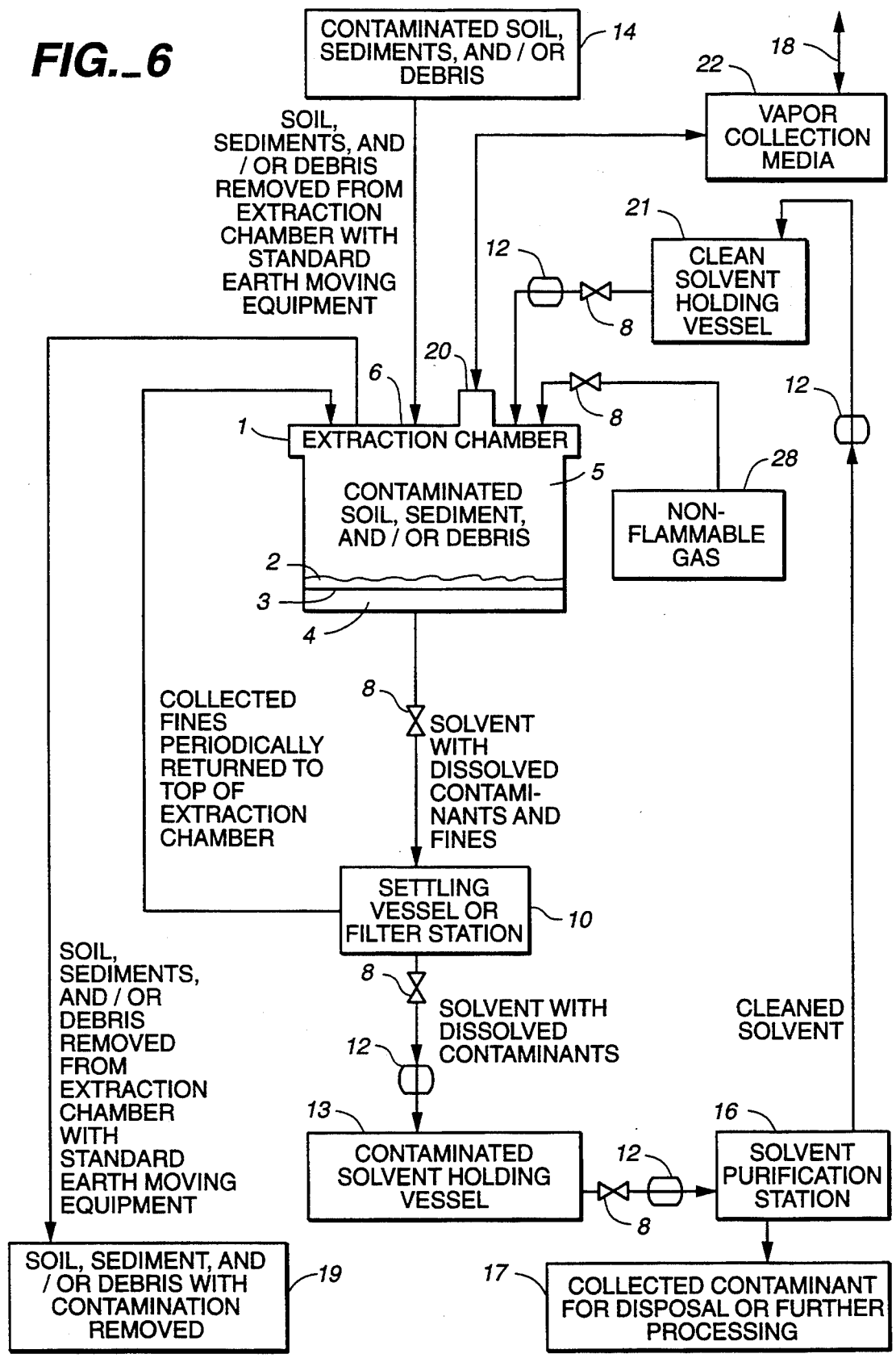
FIG._6

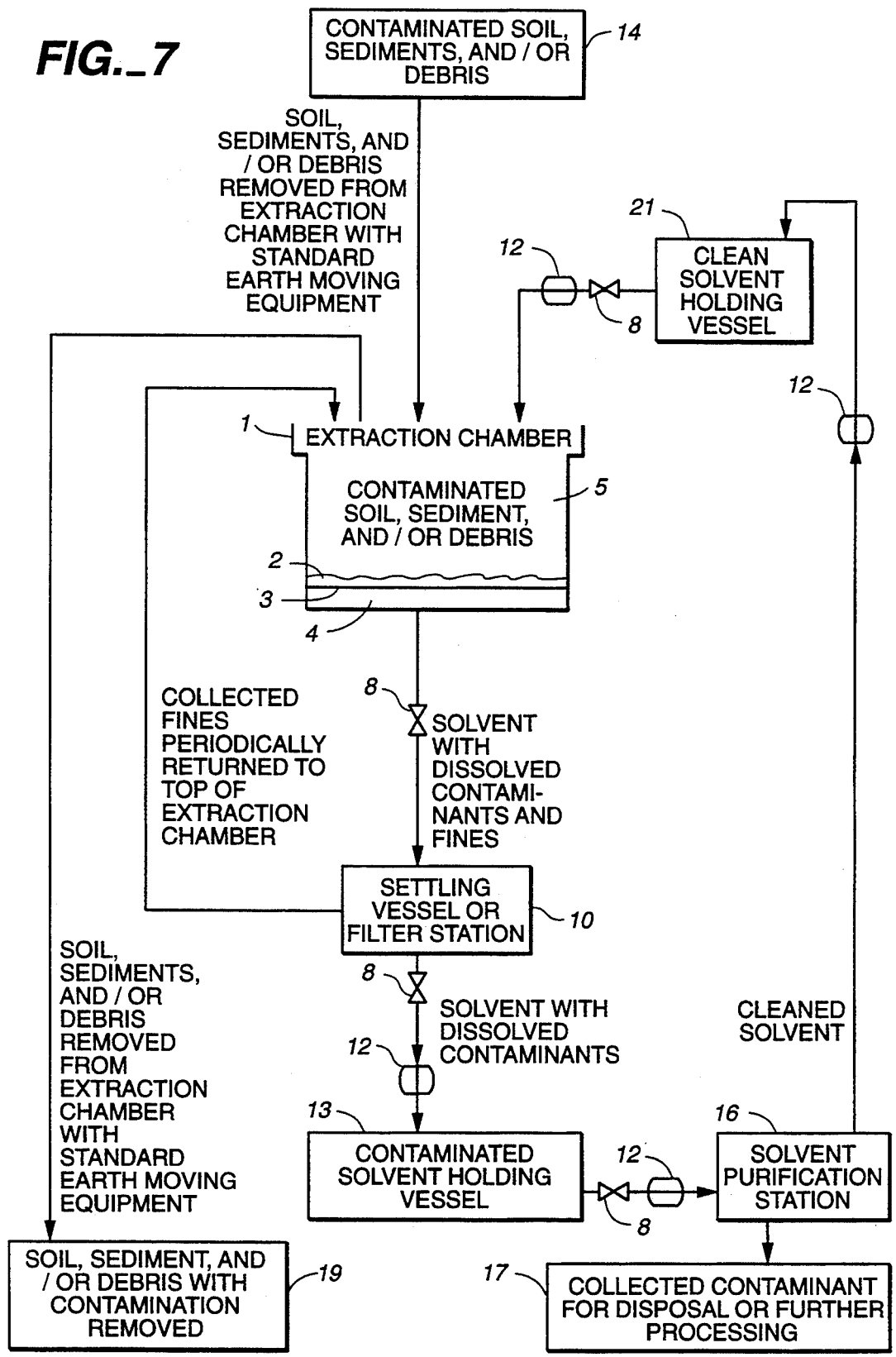
FIG._7

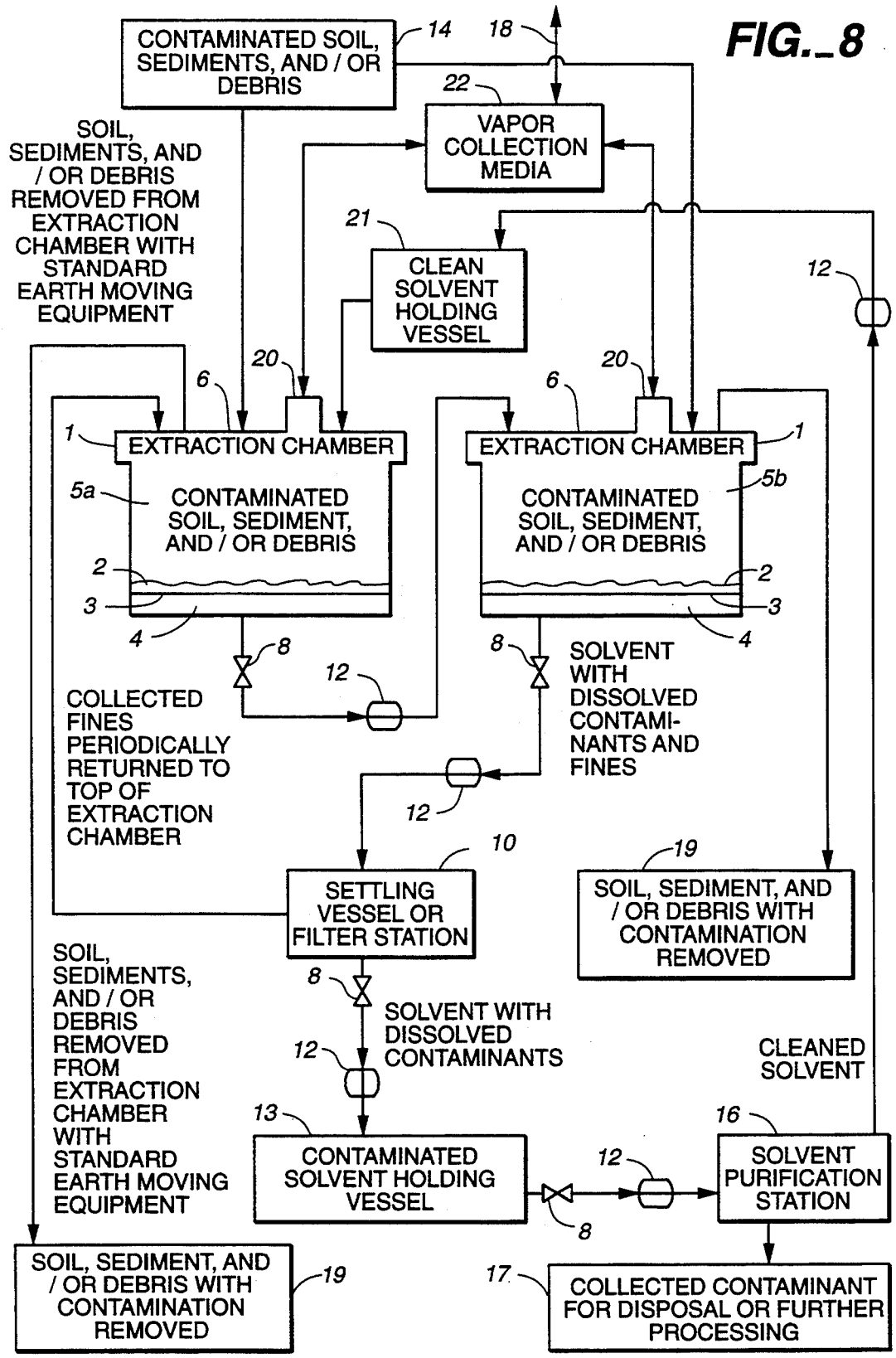
FIG._8

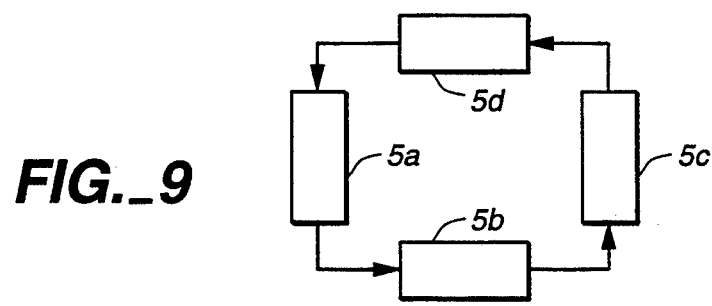
FIG._9
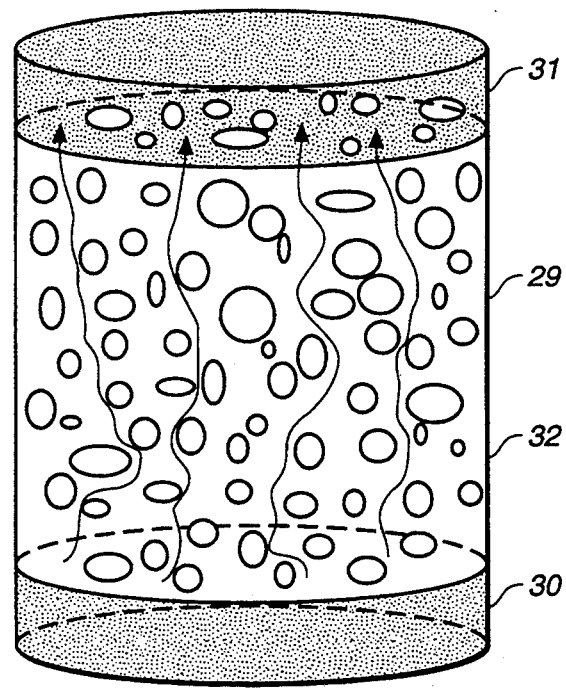
FIG._10
PRIOR ART
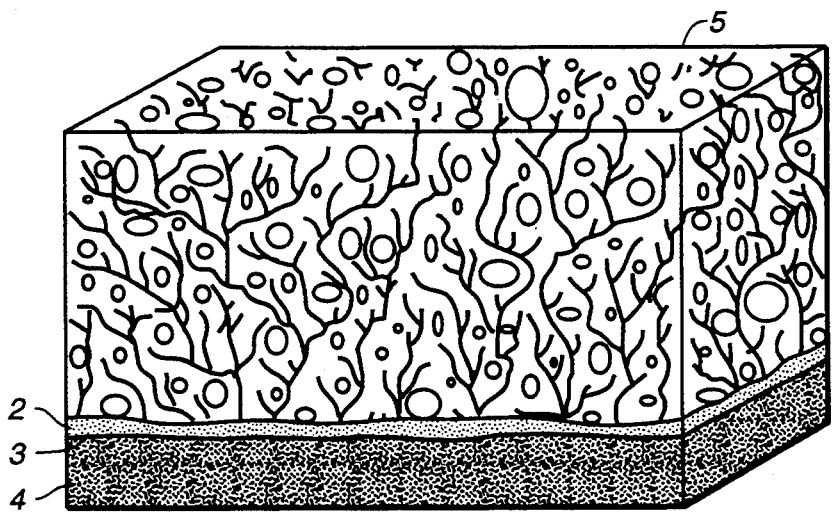
FIG._11

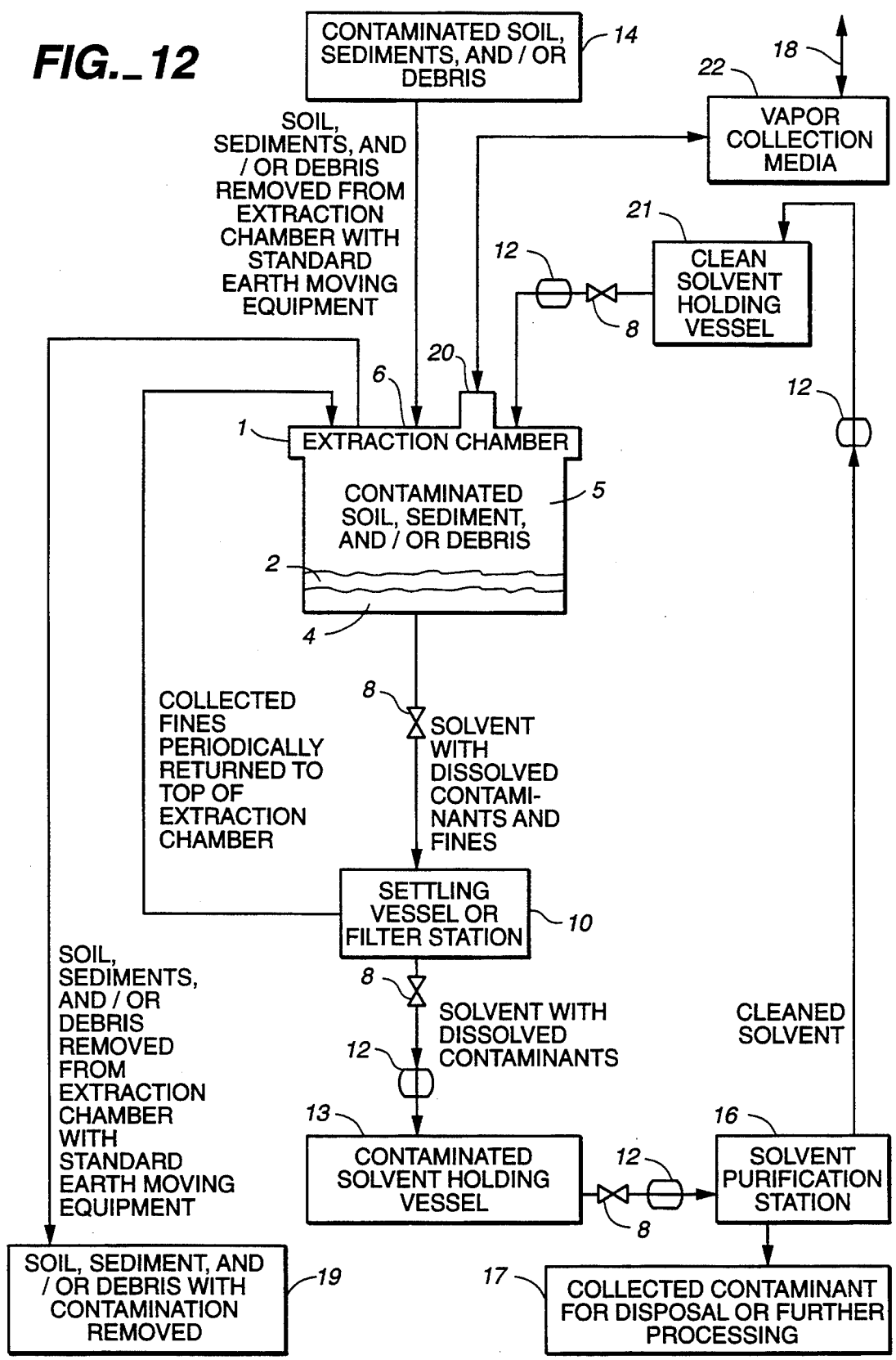
FIG._12

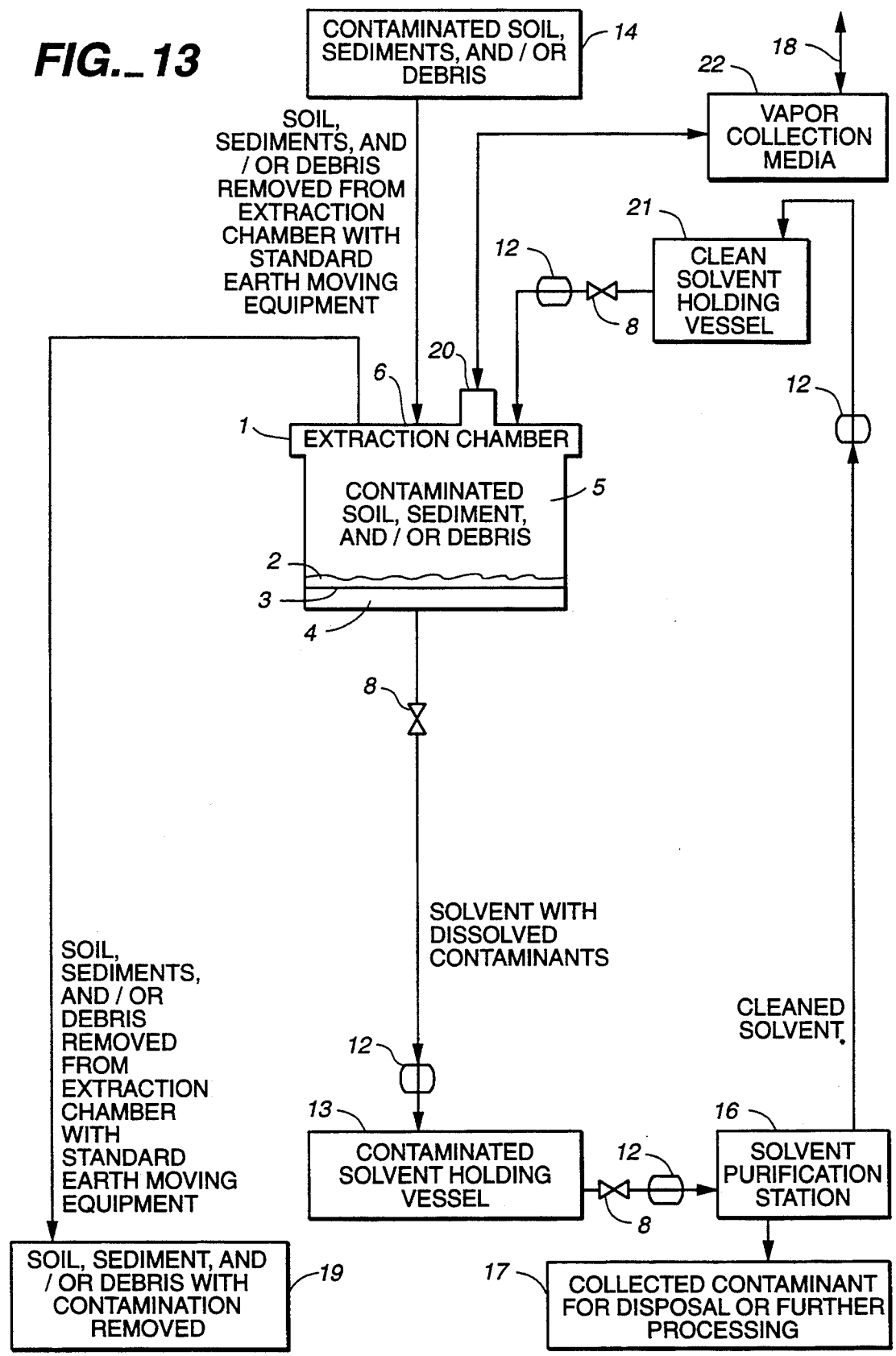
FIG._13

PROCESS FOR REMOVING HAZARDOUS, TOXIC, AND RADIOACTIVE WASTES FROM SOILS, SEDIMENTS, AND DEBRIS

FIELD OF THE INVENTION

This invention relates in general to extraction processes and in particular to removing hazardous, toxic, and radioactive wastes from soils, sediments and debris. More specifically, this invention relates to a novel low cost method of leaching that assures total treatment of the contaminated solids by eliminating channeling of the solvent.

BACKGROUND OF THE INVENTION

Heretofore, solvent extraction of hazardous, toxic, and radioactive wastes has been done with batch processes and with counter-current processes. Batch processes involved several leaching techniques, such as (i) heap-leach pile spraying, in which the solids were contacted with a uniform spray of solvent, which trickled through the pile, but did not immerse the pile; (ii) Fixed bed design, in which the solids were held in a cylindrical column and either immersed or sprayed with solvent, and the solvent was continuously removed from the top or bottom of the column; (iii) Agitated batch processing, in which solids were put in contact with a large volume of solvent by mechanical mixing.

Counter current processes also involved several leaching methods, including (iv) movement of the solids and liquids in opposite directions within a column; (v) movement of the solids and liquids in opposite directions within a fluidized bed using heavy linear agitation (such as mixers); and (vi) movement of liquids through solvents by using spinning vessels (such as centrifuges).

Each of these processes have their respective successes, but each also has a failure with regards to the removal of hazardous, toxic, and radioactive wastes from soils, sediments and debris. Of the batch methods, (i) heap leach pile spraying is very cost effective, but it is not effective in treating all of the solids. Sprays of solvent, even though uniformly applied will follow the path of least resistance, which are the most permeable paths. These paths will leach a majority of the pile, but will, however, leave areas that have been missed by the flow of solvent. These missed areas will be untreated. In the mining industry, these missed areas are of little economic value, and thus the overall process is a success. By contrast, in removing hazardous, toxic and radioactive wastes from soil, sediments, and debris, allowing some areas of solids to not undergo treatment will pose an unreasonable risk to human health and the environment.

Batch process fixed bed designs (ii) can encounter the same problem of untreated solids areas as can heap-leach piles, if the solvent is sprayed on the solids, for the same reasons as detailed above. Of interest is that in immersion fixed bed methods, in which the solids are completely covered by the solvent, the same problem of untreated solids areas can also occur. When the solids are initially immersed in solvent, all solid particles are contacted with solvent (assuming that the process has been allowed sufficient time for the fluids to permeate to all portions of the solids area). Pumping of fluids through these particles or draining of fluids through these particles will create areas of preferred flow and other areas in which there is no flow. In the preferred flow areas, solvent that has dissolved the contaminants will be removed from the particles and replaced with cleaner fluids. In the no flow areas, the solvent that has dissolved the contaminants will stay in place. No amount of further pumping or draining of fluids in the immersed vessel will remove the contaminated solvent from the no flow area. Thus, when the solvent is eventually removed from the solids, the contaminated solvent will coat the particles in the immediate area of the drainage path from the "no flow" area, and will leave contamination in the soil, sediment, or debris.

Fixed bed batch processes also have a size, shape, and time limitation factor. The wider the cylindrical cavity, the higher the chance for channeling to develop. This can be solved by making the columns taller, but this has serious economic consequences, as the solids must be loaded into the columns, and transportation of the columns to the hazardous, toxic, or radioactive sites becomes an increasingly important economic factor in whether they will be used. The shape of fixed bed batch processes is limited due to "edge effects". In a container with corners, such as a rectangular vessel, the corners are not leached as efficiently as the middle of the vessel. This limitation is of profound economic significance, because of transportation considerations. Trucks can carry rectangular vessels with much greater ease and efficiency than can they transport cylinders. Time limitations come from the fact that if the solvents are pumped too fast through the vessels containing the solids, then channeling will increase greatly. The solvent has to be pumped through the solids slowly.

Agitated batch processing (iii) can eliminate the "no flow" areas that are not treated by other batch processes. This type of process has a profound economic problem in that the solvent ratio to solids processed is very high. The inventor has been witness to batch processes that require 5:1 solvent/solid ration for each cycle of each batch process. This large amount of solvent must either be disposed of properly or have the contaminants stripped out of the solvent before being reused in the process. This limits this type of process to solvents that can be economically disposed of in large quantities, or solvents that can be stripped very efficiently. Obviously, a process that would use less solvent for processing would be desirable, if for no other reason than the capital costs of the solvent alone.

Agitated batch processing gives a higher probability of all portions of the solids being treated, but the process involves more machinery and moving parts than heap-leach pile spraying, and fixed bed designs. The costs are therefore higher for capital costs, operational costs, and maintenance costs. Agitated batch processes also mobilize fine particles that may be present in the soils, sediments, or debris, which may cause additional costs to be spent to remove the fines from the solvent. At the other end of the particle size scale, agitated batch processes have great difficulty processing oversized materials commonly found at spill sites.

Counter current processes have a major advantage in that they typically use less solvent to perform the same amount of cleaning as do batch processes. Considerable amount of work has been done in trying to perfect these processes. The counter current process of (iv) movement of solids and liquids in opposite directions within a column has the disadvantages of immersed fixed bed batch processes described above. "No flow" zones still exist within these columns, leaving portions of the solids untreated, and the size, shape and time limitations described above are also a problem. In addition, the ability to reach a true steady state in which the solids and liquids are in counter-flow is very difficult in practice, and requires very specialized machinery with detailed process information. Slight changes in temperature, input feed, contamination levels, moisture contents, or other variables throws the system off, which may result in poorly treated solids areas. Further, this process has problems with oversized material, which tends to channel the solvent, leaving areas untreated.

Counter current processes using (v) fluidized beds and heavy linear agitation also have many of the same problems as described above for column counter current processes. They are not limited to cylindrical shaped extraction chambers, which is a point in their favor. They do require energy intensive mixing and again, extensive machinery and process control in order to work properly. Thus, again, costs are higher for capital costs, operational costs, and maintenance costs. Fines are also mobilized, which may cause additional costs to be spent to remove the fines from the solvent. Oversized material is also a problem. The energy intensive mixing is also loud.

Counter current devices and processes that employ (vi) spinning vessels have made progress in establishing the steady state required for counter current leaching, but are very complex in design and operation, with large numbers of moving parts. As with other counter current processes, they are limited by size, shape, and time constraints. Particle size of the input feed is also a problem with these systems, as oversized material can no be processed with these systems without further treatment (such as crushing). Again, similar to other complex machinery, they suffer from higher costs due to capital, operational, and maintenance costs.

As first mentioned above, solvent extraction processes for the removal of hazardous, toxic and radioactive wastes from soils, sediments, and debris have a special consideration over other systems used in the mining and other industries, in that untreated sections of solids is unacceptable to human health and the environment. In addition to this, solvent extraction processes used to remove hazardous, toxic and radioactive wastes must also compete in the marketplace against other technologies that deal with these wastes. Thus, economic considerations are a critical factor in determining applicability technology and forwarding the overall discipline. Current methods available that assure all untreated sections of solids are treated can use improvements that lower the economic capital costs, operational costs, maintenance costs, and transportation cost in moving the system to the contaminated site.

SUMMARY AND OBJECTS OF THE INVENTION

In view of the foregoing limitations and shortcomings of prior art devices as well as other disadvantages not specifically mentioned above, it is apparent that a need exists in the art for a low cost and highly effective method of removing hazardous, toxic, and radioactive wastes from soils, sediments, and debris.

It is therefore an object of this invention to fulfill that need by providing a process for very high effective leaching of hazardous, toxic, and radioactive wastes from soils, sediments, and debris, that is also economically viable to produce, transport, operate, and maintain.

Another object of this invention is a process in which little or no mechanical mixing is necessary for the effective leaching, reducing capital costs, maintenance costs and operational costs.

Yet another object of this invention is a process in which any closed bottom vessel can act as the extraction chamber in the leaching process, without regard to "edge effects" discussed previously.

A further object of this invention is a process that can effectively leach any mix of solid sizes, including oversized material.

A further object of this invention is a process that is an easily transportable high efficiency leaching process.

A further object of this invention is a process which reduces the amount of solvent necessary for treatment of hazardous, toxic, or radioactive wastes in soils, sediments, or debris.

A further object of this invention is a process that can effectively leach any contaminant level in soils, sediments, or debris.

A further object of this invention is a process that is a near noiseless high efficiency leaching process, allowing urban sites to be addressed.

A further object of this invention is to reduce the number of times soil, sediments, and debris are moved in the treatment process, thereby reducing wear on equipment, reducing energy consumption of the process, reducing maintenance of devices using this process, reducing operational costs, and reducing capital costs.

A further object of this invention is to reduce the amount of fines present in the resulting contaminated leachate, thereby reducing settling time or the number of filters necessary for operation.

A further object of this invention is allow the option of the desorption of the solvent from the soil, sediment or debris to take place in the same chamber as the extraction, thereby reducing the need for physical movement.

A further object of this invention is to allow increases or decreases in the size of the extraction vessels without the associated changes in channeling in the extraction chamber.

These objects and other objects not specifically mentioned above are accomplished in accordance with preferred embodiments of the present invention by an immersion and full drainage, high effectiveness, economic leaching process.

BRIEF DESCRIPTION OF THE DRAWINGS

A preferred embodiment of the invention is illustrated and described in the accompanying drawings wherein like numbers refer to like parts and in which:

FIG. 1 is a schematic representation describing the interconnection between various portions of the process.

FIG. 2 is a schematic representation of a first alternative embodiment of the present invention.

FIG. 3 is a schematic representation of a second alternative embodiment of the present invention.

FIG. 4 is a schematic representation of a third alternative embodiment of the present invention.

FIG. 5 is a schematic representation of a forth alternative embodiment of the present invention.

FIG. 6 is a schematic representation of a fifth alternative embodiment of the present invention.

FIG. 7 is a schematic representation of a sixth alternative embodiment of the present invention.

FIG. 8 is a schematic representation of a seventh alterative embodiment of the present invention.

FIG. 9 is a schematic representation of a eighth alternative embodiment of the present invention.

FIG. 10 is an isometric view of the prior art of leaching columns (fixed bed and counter-current).

FIG. 11 is an isometric view of Immersion and Full Drainage Leaching used in the present invention.

FIG. 12 is a schematic representation of a ninth alternative embodiment of the present invention.

FIG. 13 is a schematic representation of a tenth alternative embodiment of the present invention.

| REFERENCE NUMERALS IN DRAWINGS | |
|---|---|
| 1. Top Seating Area | 2. Fine Clean Sand |
| 3. Filter Sheet | 4. Highly Porous and Permeable Media |
| 5. Extraction Chamber | |
| 7. Fluid/Vapor Valve | 6. Removable Lid |
| 9. Vapor Valve | 8. Fluid Valve |
| 11. Fluid Valve | 10. Settling Vessel or Filter Station |
| 13. Contaminated Solvent Holding Vessel | 12. Fluid Pump |
| 14. Contaminated Soil/Sediments/Debris Pile | 17. Collection Vessel for Contamination |
| 16. Solvent Purification Station | 19. Clean Soil/Sediments/Debris |
| 18. Inlet and Outlet Vent | 21. Clean Solvent Holding Vessel |
| 20. Vent in Removable Top Piece | |
| 22. Vapor Collection Media | 23. Vacuum Pump |
| 24. Condenser | 25. Tank for Microbes, Nutrient, and Water |
| 26. Heating collar around Extraction Chamber | 28. Non-flammable Gas Container/Generator |
| 27. Steam Generator | |
| 29. Leaching Column | 30. Manifold for Solvent Distribution |
| 31. Solvent and Dissolved Contaminant Collection Manifold | m Number of extraction chambers |
| 32. "No Flow Zones", Untreated Areas. | |
| n Number of extraction cycles | |

DESCRIPTION OF INVENTION

FIG. 1 is a schematic representation of a leaching process for removing hazardous, toxic, and radioactive wastes from soil, sediments and debris. Starting with a pile of excavated soil/sediment/debris (14), the soil is moved by any earth moving technique including but not limited to front end loaders, augers, conveyor belts, and backhoes into the extraction chamber (5). The extraction chamber can be any size or shape of vessel that will contain the solvent without reacting with the solvent. Examples of extraction chambers include but are not limited to fiberglass, high density plastics, stainless steel and concrete vessels which can be used for many organic solvents and surfactants, while fiberglass, glass, and stainless steel can be used for many acid and base solvents. The vessels can be above ground, or in ground, transportable or fixed. The extraction chamber will use a removable top cover impermeable and non-reactive to the solvent vapors if these vapors cause a threat to human health or the environment. Examples of these covers include but are not limited to plastic sheets, stainless steel lids, glass lids, fiberglass lids, and flexible rubber sheets. If the removable to piece is used, a vent in the piece allows air or alternately, non-flammable gasses, to enter and exit the extraction chamber. The air to and from the extraction chamber passes through a porous and permeable vapor collection media (22) to stop vapors from escaping to the atmosphere. Examples of the porous and permeable vapor collection media include but are not limited to water bubblers, activated carbon, and molecular sieves.

The removable top piece (6) is attached to the extraction chamber (5) at the top sealing area (1). This sealing area can be but is not limited to rubber gaskets, bolt down mechanisms, shock cords or soft putty. Within the Extraction Chamber (5) the bottom is lined with a highly porous and permeable media (4) that will support the filter (3) and will serve as a collection area for leachate. Examples of highly porous and permeable media (4) include but are not limited to pebbles, marbles, plastic beads, and plastic netting. The filter (3) can be a solid sheet or layers of sheets covering the highly porous and permeable media (4). The filter should be compatible with the contaminants in the soils, sediments, and debris and also compatible with the solvent selected. The filter should also allow the free movement of fluids and vapors, but should retard fine particles. Examples of the filter (3) include but are not limited to reinforced filter paper, non-woven geotextiles, and fine netting. Above the filter (3) a fine sand (2) holds the filter in place, serves to collect formation fines that are mobilized during the leaching, and prevents premature loading of the filter (3). The contaminated soil, sediment, and debris to be leached is placed directly on the clean fine sand.

After leaching, the cleaned soil, sediments, and debris is removed from the extraction chamber with standard earth moving equipment for either reuse at the site, transportation offset, or for further treatment (19). Contaminated solvent from the leaching process is removed from the highly porous and permeable media (4) by either gravity drainage or by pump through rigid or flexible pipes to a settling vessel or filter station (10). This settling vessel or filter station removes any suspended solids from the contaminated leachate that may have come from the extraction chamber. Examples of settling vessels or filter stations include but are not limited to tower clarifiers, flocculation tanks, sand filters, bag filters, and cartridge filters. Collected fines from the settling vessel or filter stations can be returned periodically to the top of the soils, sediments, and debris in the extraction chamber by any method including but not limited to hand carrying, augers and belts.

Contaminated solvent from the Settling Vessel or Filter Station (10) is gravity fed or pumped to the contaminated solvent holding vessel (13). This vessel should be compatible with both the collected contaminant and the solvent selected for use at the site. The contaminated solvent is then gravity fed or pumped to the solvent purification station (16) where the contaminant is removed from the solvent. Examples of this include but are not limited to distillation systems, evaporation systems, molecular sieves, activated carbon, biomass collection systems, and ion exchange columns. The collected contaminant is placed in vessels (17) for disposal or further processing. The clean solvent is either gravity fed or pumped through rigid or flexible pipe to the clean solvent holding vessel (21). The clean solvent holding vessel should be constructed of materials compatible with the solvent selected. The clean solvent from this vessel is then gravity fed or pumped to the extraction chamber (5).

FIGS. 2, 3, 4, 5, 6, 7, 8, 9, 12, and 13 are schematic representations of alternative preferred embodiments of the present invention wherein the relationship between various processes shown in FIG. 1 are substantially the same. However, as exemplified by these alternative preferred embodiments, various processes can be introduced or removed without departing from the spirit of the invention which is intended to be protected.

FIG. 2 shows a leaching process of a second preferred embodiment of the present invention. A vacuum pump (23) is connected to the extraction chamber (5) pulling a vacuum through the porous and permeable media (4). The vapors collected with the vacuum pump (23) can either be condensed with the condenser (24), or vented through vapor collection media (22) and out through a vent (18). Condensed vapors from the condenser (24) are returned to the clean solvent holding vessel (21).

FIG. 3 shows a leaching process of a third preferred embodiment of the present invention. Live steam (21) can be added to the extraction chamber from a steam generator.

FIG. 4 shows a leaching process of a fourth preferred embodiment of the present invention. A heated jacket (26) surrounds the extraction chamber. This jacket can be heated by fluids including but not limited to steam, hot water, hot air, hot gasses, hot solvents, or can be electrically heated.

FIG. 5 shows a leaching process of a fifth preferred embodiment of the present invention. A holding vessel (25) is filled with water and with solvent consuming microbes. This vessel is connected to the extraction chamber (5) by means of flexible or rigid pipe. The fluid from the microbial holding vessel (25) is either gravity fed or pumped to the extraction chamber (25)

FIG. 6 shows a leaching process of a sixth preferred embodiment of the present invention. Non-Flammable Gas (28) is connected to the extraction chamber (5) by means of flexible or rigid pipe. The gas from the non-flammable gas source is supplied to the extraction chamber by means of flexible or rigid pipe. The non-flammable gas would be vented away from the extraction chamber through the porous and permeable vapor collection media (22) and then out to the atmosphere. Examples of non-flammable gas and their sources include but are not limited to carbon dioxide and nitrogen bottles, and nitrogen generators.

FIG. 7 shows a leaching process of a seventh preferred embodiment of the present invention. The extraction chamber is shown without a lid and venting system.

FIG. 8 shows a leaching process of an eighth preferred embodiment of the present invention. Multiple extraction chambers are used from two, (shown) to any number greater than two. The contaminated solvent from the first extraction chamber (5a) is gravity fed or pumped to the second extraction chamber (5b) by means of flexible or rigid pipes. The contaminated solvent from the first extraction chamber can be fed into the second extraction chamber though any point, it does not have to enter the top or the bottom of the tank. Contaminated solvent from the second extraction chamber (5b) is gravity fed or pumped to either the third extraction chamber (not shown) and so on to as many chambers exist in linear fashion, or to the settling vessel or filter station (10) for fines removal. The vents from multiple extraction chambers are typically connected to the same vapor collection media (22), but can also have individual vapor collection media stations.

The extraction chambers do not have to be of the same shape, or size, but if they do not hold the same fluid volumes, the difference must be either stored in vessels until used, or made up from another source.

FIG. 9 shows a leaching process of a ninth preferred embodiment of the present invention. Multiple extraction chambers are used but are arraigned in a closed loop fashion. The contaminated fluids from the first extraction chamber (5a) is fed to the second extraction chamber (5b) and so on until all extraction chambers have been leached in similar fashion. The last extraction chamber (here shown to be 5d, but can be any number of chambers) feeds contaminated solvent to the settling vessel or filter station (10).

When the soils, sediments and/or debris from the first chamber is clean, the solids are removed, and new solids are placed in the vessel for leaching. This first vessel then becomes the last vessel in the treatment series, and the previously second vessel becomes the first vessel. This act of switching the first vessel to the last vessel and the second vessel to the first vessel in the treatment series can be repeated throughout the entire chain of vessels.

FIG. 12 shows a leaching process of a tenth preferred embodiment of the present invention. The basal filter (3) shown in many of the FIGS is not present in the extraction chamber (5).

FIG. 13 shows a leaching process of an eleventh preferred embodiment of the present invention. The settling vessel or filter station (10) has been removed from the process.

FIG. 10 shows an isometric view of a leaching column from previous art. The contaminated soils, sediments, and/or debris are placed in the column (29) and leached with a moving solvent. The solvent can flow upwards, downwards, or sideways. Solvent is distributed over the solids via a manifold (30), and collected at the other end with another type of manifold (31). "No Flow Zones" (32) showing untreated areas are areas in which the solvent does not move.

FIG. 11 shows an isometric view of one possible type of extraction chamber (5) (an elongated box) with comers. Contaminated soils, sediments, and/or debris is loaded into the chamber from the top or side onto the top of fine sand (2). The fine sand is on top of a filter media (3), which is on top of highly porous and permeable media (4). A valve (8) (not shown in this diagram) stops solvent from leaving the bottom of the extraction chamber (5).

FIG. 11 also shows solvent flow paths during drainage of the extraction chamber (5). Notice the absence of "no flow zones" (32), untreated areas of the extraction chamber.

OPERATION OF INVENTION

Referring to FIG. 1, Contaminated soils, sediments, and/or debris (solids, for brevity) are moved from their collection point to an Extraction Chamber (5) by any type of earth moving equipment. The extraction chamber is loaded with the solids into the top of the vessel or in through a side door. The solids sit on, in direct contact with, a fine sand bed or other porous and permeable media (2) located near the bottom of the extraction chamber. The fine sand sits upon a permeable filter (3) and the filter sits upon a porous and permeable media (4). The porous and permeable media is contained by the bottom of the extraction chamber. After the solids are loaded into the extraction chamber, a lid (6) is placed on the extraction chamber and sealed at a sealing area (1). A vent in the lid of the extraction chamber (2) is opened so that air, vapors, and non-flammable gas can move in and out of the extraction chamber. This movement of the gases allows gasses in the solids to move freely in and out of the porous areas in the solids, and also allows liquids to enter and be removed without being blocked by the gasses or by vacuums created in the porous spaces by retreating liquids.

The gasses move from the vent in the extraction chamber to a vapor collection media (22). This media strips targeted contaminants from the expelled gasses from the extraction chamber. An example of this would be venting air and a chlorinated solvent vapor though an activated carbon filter. The filter would remove the chlorinated solvents while allowing the passage of air in and out of the extraction chamber. Air enters and leaves the system thought a vent (18) attached to the vessel holding the vapor collection media.

The air is moved into and out of the extraction chamber by the movement of solvent within the chamber. The solvent can be any selected solvent or combination of solvents that will dissolve or otherwise be able to mobilize the contaminants of concern. The process is not solvent specific. Examples Of such solvents include but are not limited to Citric Acid, which has been shown to mobilize Plutonium at some radioactive soil sites, and hexane which has been shown to mobilize Polychlorinated Biphenyls in soils, sediments, and debris.

The solvent is introduced into the extraction chamber from any direction or in multiple directions until the solids are completely immersed in solvent. The solvent is allowed to be in contact with the solids until the gasses that were in the pore spaces between the solid particles have traveled upwards and out of the bulk solids, and until the contaminants of concern are dissolved by the solvents. This time will be different for different soils, sediments, and debris types, contaminant types, contaminant levels, and the size and shape of the extraction chamber. The time is determined through initial bench scale and pilot scale testing before full scale work proceeds. In some eases, the time to dissolve the contaminants of concern will happen quickly, such as dissolving benzene in a hexane solvent. In other cases, the time to dissolve the contaminants will happen slowly, as in hydrochloric acid solubilizing lead shot in soil from a firing range site. There will also be cases where the contaminant will not completely dissolve in a reasonable or desired time frame, but will dissolve 50 to 90% of the contaminant within a reasonable or desired period. In partial dissolving cases, the leaching time is again determined by the bench and pilot scale tests which show a maximum removal rate when all factors are plotted, including the number of leaching cycles, and the time of each cycle.

After the leaching time is completed, the solvent is drained or pumped from the tank by draining or pumping out the porous and permeable media (4). The solvent from the contaminated solids area in the extraction chamber will drain into the fine sand, through the filter, and into the porous and permeable media to be drained or pumped out of the extraction chamber. The drainage of the contaminated solids continues until the all the solids are drained. In this manner, the separation of the solvents from the solids is highly effective over time. Each portion of the solids have thus been in contact with the solvent, and then had the solvent removed by the drainage action.

The drainage of solvents from the solids is a low energy process than is used in high agitation systems. This process limits the migration of fines from the solids, because the ability of the solvents to carry fines is limited by the low energy migration of the solvent from the solids. A large majority of the fines stay in place within the solids area, and thus do not need to be removed from the solvent stream at a later date. This is a competitive advantage.

The fines from the solids that are mobilized from the solids area are then trapped in the fine sand bed (2) overlaying the filter, and within the filter (3) itself. A small number of fines may still move through the sand overlaying the filter and the filter, and these fines are pumped or are gravity fed with the contaminated solvent to a settling vessel or filter station (10). The fines can be removed from the solvent by processes including but not limited to simple settling, flocculation, encapsulation, filtration, centrifuging or filter pressing. The collected fines at this station are periodically returned to the top of the extraction chamber, on to the top of other soil, sediments and debris. By replacing the fines back with the solids, they no longer become a disposal item. The solids below the fines will act as a filter to prevent these fines from again leaving the extraction tank, in all but the most permeable of solids. The low energy nature of the solvent flows also helps to keep these newly placed fines within the extraction chamber.

The contaminated solvent from the settling vessel or filter station is pumped or is gravity fed to a contaminated solvent holding vessel (13) which acts as a volume buffer for the solvent purification station. A buffer may not always be needed in this process, but will be typically used because of the variability in the rate of leachate generation. At the start of a drainage cycle, the contaminated solvent from the extraction chamber will leave the chamber at a much greater rate (and thus greater volume of solvent) than at a time near the end of the drainage cycle. A volume buffer is used so as to more closely match the processing rate capacity of the solvent purification station. Sometimes this volume buffer is combined with the settling vessel or filter station.

From the contaminated solvent holding vessel the contaminated solvent is pumped or gravity fed to a Solvent Purification Station (16). At this station the contaminant is removed from the solvent so that the solvent may be reused in other portions of the system. The contaminant may be removed by processing including but not limited to distillation, evaporation, microfiltration, molecular sieving, biological adsorption, other adsorption processes, chemical precipitation, and ion exchange methods.

The cleaned solvent is then sent to a Clean Solvent Holding Vessel (21) which acts as a volume buffer for the extraction chamber. Collected contaminants (17) from the solvent purification station are then disposed or further processed by standard methods, either at the site or off of the contaminated site.

Solvent from the clean solvent holding vessel is added back to the extraction chamber after the drainage cycle has been completed. In this fashion, multiple extractions of the solids can be performed without having to move any of the solids. After the extraction of the contaminants from the solids is complete, then no new solvent is added at the end of the leaching process. The top of the extraction vessel is removed, and the soils, sediments, and debris is removed from the extraction chamber with standard earth moving equipment. Alternately, a vessel side is removed (not shown), and the solids are removed from the side of the extraction chamber with standard earth moving equipment. During the removal process, portions of the sand bed may be removed and replaced with fresh sand, and the basal filter may also be replaced if necessary at this time.

Soil, Sediment, and Debris with Contamination Removed (19) from the extraction chamber can be further processed or used at the site depending upon regulatory, risk, and other restrictions.

During drainage, not all of the solvent will leave the extraction chamber. Some solvent will coat the solids and will remain with the solids. The amount of solvent retained by the solids after full drainage will be different for each type of material being leached. To scientifically calculate this amount, a variety of variables must be known in great detail, including but not limited to the capillarity, solids type, surface tension factors, viscosity of the solvents, hydrostatic head pressures, other pressures, and special effects such as emulsification problems. In practice, this is difficult if not impossible to predict. The inventor has therefor previously defined an empirical value, Rx, to represent the solvent left in the solids after full drainage. The Rx value is easily measured by immersing a solids sample in a known amount of solvent, draining the solvent, measuring the drained solvent, and subtracting the measured drained solvent from the total initial solvent used. Knowing the Rx for a particular solids type can be important in estimating processing time (and costs). Defining other terms:

Icl = initial contaminant level
Fcl = final contaminant level
Vs = volume of dry solids processed
Vx = volume of solvent to be used
and more precisely, Rx = solvent retention of the solids after draining expressed as the fraction of the volume of solvent not removed from the solids (before any drying or vacuum desorption) to the dry solids volume.

For single batches
$$Fcl = Icl \text{ when } Vx/Vs < Rx$$

and $$Fcl = (Icl*Vs*Rx)/Vx \text{ when } Vx/Vs > Rx$$

Using simple algebra, the volume of solvent necessary to obtain the "Desired contaminant level" (Dcl), sometimes also referred to as the "target level" in the solids can be determined from the following equation:

$$Vx = (Icl*Vs*Rx)/Dcl \text{ when } Vx/Vs > Rx$$

Most single batch extraction processes must use large volumes of solvent. This typically necessitates recycling of the solvent in a closed loop fashion. The procedure can be made more efficient by using the process a number of times rather than increasing the solvent volume. For multiple extractions:

$$Fcl = Icl \text{ when } Vx/Vs > Rx$$

and $$Fcl = (Icl*Vs^n*Rx^n)/Vx^n \text{ when } Vx/Vs > Rx$$

where n is the number of extraction cycles with solvent volume Vs.

Similarly, the volume of solvent necessary to reduce the solids to a desired contaminant level is given by the following equation:

$$Vx = ((Icl*Vs^n*Rx^n)/Dcl)^{1/n}$$

The fact that multiple extractions can be more effective for a given volume of solvent is seen in the following example:

One cubic yard of solids originally contaminated with 50 ppm PCBs is put through a solvent extraction procedure 3 times with 0.40 cubic yards of solvent each time (a total of 1.2 cubic yards of solvent). The retention of the solvent by the solids is 20%. The final PCB concentration for multiple batch extraction processing is as follows:

$$Vx/Vs > Rx$$

$$\begin{aligned} Fcl &= (Icl * Vs^n * Rx^n)/Vx^n \\ &= (50 * 1.0^3 * 0.2^3)/0.4^3 \\ &= 6.25 \text{ ppm} \end{aligned}$$

For single batch extraction processing:

$$Vx/Vs > Rx$$

$$\begin{aligned} Fcl &= (Icl * Vs * Rx)/Vx \\ &= (50 * 1.0 * 0.2)/1.2 \\ &= 8.33 \text{ ppm} \end{aligned}$$

As can be seen, for the same amount of solvent, the multiple extractions lower the contamination level further than the single extraction.

In this invention the volume of solvent used in each batch will be slightly greater than the total overall porosity of the solids within the extraction tank. The solvent needs to be slightly greater so that all portions of the solids are immersed within the solvent. The solvent level should not be far above the top of the solids level however, because this may lead to channeling of the solvent from above the solids during drainage, lowering the efficiency of the system.

In operation, the initial levels of contaminants in the solids are determined by initial site assessments, and desired levels or target levels of contaminants to be left in the solids are determined by regulation, risk, and other factors for each site to be processed. The average Rx value and the porosity of the solids at the site can be determined from a very quick bench scale tests, and thus the number of extraction cycles to clean the solids can be determined. This number, n, will be an estimate used in pricing the work to be performed, and will be used as a guide at the site. During the actual process however, the contaminant levels in the solvent are measured directly with equipment that may include but not be limited to gas chromatography, mass spectrometers, turbidity meters, radioactive particle counters, or immuno-assay detectors. The reason this is done is because of the variability of the contaminant in soils, sediments, and debris. Samples of the solids may not indicate the presence of "hot spots", which are localized areas of much higher concentration of the contaminants than the surrounding areas. These hot spots will be leached by this procedure, and monitoring the leachate from the extraction chamber will give an indication when all the solids are cleaned to target levels, not just when average samples are clean.

Alternate preferred embodiments to the current invention can be implemented depending upon individual site conditions. These embodiments are referred to in FIGS. 2, 3, 4, 5, 6, 7, 8, 9, 12 and 13, and operations with these will be discussed below.

Referring to FIG. 2, the operational procedure is the same as FIG. 1, except that a vacuum pump (23) has been added to the process. The vacuum pump can be used to dewater the solids in the extraction chamber by either pulling a vacuum on the extraction chamber, thus volatilizing the water and collecting it, or by pulling gasses through the solids to volatilize the water and collect it. Dewatering the solids is a necessary step to some solvent extraction processes. The water vapor is sent from the vacuum pump to a Vapor Collection Media (18) which would collect the water and which may also process the water to remove any collected volatile contaminants. The water could then be discharged or reused at the site.

In addition to dewatering the solids before beginning the extraction cycle, the vacuum pump could also be used to remove residual solvent from the solids at the end of the extraction cycle. Many solvents used in solvent extraction are very volatile and can be removed to very low levels by vacuum extraction of the solids in the extraction chamber. Recovered solvent vapors would be sent to a Condenser (24) to condense the solvent vapors to a liquid form. The collected liquid solvent from the condenser would then be sent to the clean solvent holding vessel, or alternately to the solvent purification station (this step not shown) for reuse.

The process in FIG. 3 is similar to FIG. 2, with the addition of a Steam (21) input into the extraction chamber. This steam would be injected into the extraction chamber at the end of the extraction cycle in order to assist volatilization of the residual solvent. This greatly lowers the time for desorption of the residual solvent from the solids. Alternately, hot gases can be used instead of steam (not shown).

FIG. 4 is similar in operation to FIG. 1, except that a heating jacket has been installed around the extraction chamber. Some contaminants go into solution faster if they are heated. This preferred embodiment allows for heating of the chamber and solids and solvents within the chamber. Alternately, the solvent used in the process could be heated by a separate step before being introduced into the extraction chamber (not shown). The heating of the extraction chamber can also be used during dewatering of the solids, or during vacuum desorption of the residual solvents.

FIG. 5 shows a process similar to FIG. 1, with the additional embellishment that a vessel containing Water with Solvent Consuming Microbes (25) has been added to the process. The microbes would be added to the solids after the completion of the extraction cycle in order to remove any residual solvent. Alternately, the microbes could be added to the extraction chamber after vacuum extraction of the solvents in the chamber (FIGS. 2 and 3). The vacuum extraction would reduce solvent levels, and the microbes would further reduce the residual solvent levels. Alternately, the microbes could be added to the solids after they are removed from the extraction chamber (process not shown) in order to reduce the residual solvents in the solids to acceptable levels.

FIG. 6 shows a process similar to FIG. 1 with the additional embellishment that a non-flammable gas (28) is added to the extraction chamber (and any other chambers, not shown) in order to prevent explosive conditions when using flammable solvents. This procedure would increase the safety of the operations. Note that air would not be allowed to enter the extraction chamber during cycling of the solvents, but instead, the non-flammable gas would be used for all gas inputs. For gas outputs during cycling of the solvents, the non-flammable gas could be either vented through the vapor collection media, or recollected and reused. It is important to note that the non-flammable gas will need to be replaced prior to beginning the first extraction of each batch of solids. It is also important to note that this fire prevention measure many not be necessary even when using flammable solvents. During the extraction cycles, the solvent vapors will typically be above the upper explosive limit (also known as UEL), and thus could not ignite. Additionally, the low energies used in this system would also tend to eliminate ignition sources.

FIG. 7 schematically depicts a process similar to FIG. 1, except that the top to the extraction vessel is not used. This process would be used in cases where vapors from the extraction chamber are not a concern for human health or the environment. An example of this may be using water to leach salt out of older oilfield soils.

FIG. 8 schematically depicts a process similar to FIG. 1, with the additional embellishment that a Series of Multiple Extraction Chambers (shown here as 5a and 5b) are used. Any number of extraction chambers can be used in series. The advantage of series extraction is that the mobilized fines are only removed from the solvent stream, and the amount of solvent processed by the solvent purification station is greatly reduced.

Clean solvent fills the first extraction chamber is then drained from the extraction chamber. The drained contaminated solvent is fed into the second extraction chamber, usually near the top of the chamber, so that the solids in the chamber may act as a filter to remove any fines transported from the first extraction chamber. In this manner, the second extraction chamber is filled with solvent from the first extraction chamber. If the soils are in the first extraction cycle, then additional solvent may need to be added to the second extraction chamber as make-up for the residual solvent still left in the solids in extraction chamber 1.

The second extraction chamber is then drained, and the drained solvent is fed into the next extraction chamber (not shown), in a similar fashion to filling the second extraction chamber. The next extraction chamber is then drained of solvent which is sent to a further extraction chamber (not shown). This process continues until the final extraction chamber, where the drained solvent is then sent to the settling vessel or filter station, similar to the process in FIG. 1.

Multiple extraction chambers are usually successful in decreasing the amount of solvent processed by the solvent purification station by a factor of "m", where m is the number of extraction chambers. There is a limit to the number of extraction chambers that can be used effectively at a site. This is determined by factors including but not limited to the size of the site, the size of the extraction chamber, the capital costs of the extraction chamber and support equipment, the Rx of the solids, the desired contaminant level, the number of extraction repetitions (n), and the initial contaminant level in the solids.

One of the reasons for the success of multiple extraction chambers is that the solvent has the capacity to hold much more contaminant than exists in the solids. Using multiple extraction chambers, clean solvent is only fed into the first chamber, and the solids in this chamber are cleaned faster than the solids in progressive chambers. When the solids in the first chamber are clean, the solids in the other chambers will typically still be contaminated. The first chamber is then emptied of the clean solids, and contaminated solids are placed in the first extraction chamber. Clean solvent is then introduced into the second chamber instead of the first chamber. Solvent from the last chamber is fed into the first chamber, and then is sent to the settling vessel or filter station. In effect, the first chamber becomes the last chamber, the second chamber becomes the first chamber, the second chamber becomes the third chamber, and so on. This switching of which extraction chamber receives the clean solvent is continued as the solids in the second, third, and so forth extraction chambers are progressively cleaned.

The most convenient set-up of multiple extraction chambers is a closed ring so that the progressive nature of the solids clean-up can be easily tracked. A closed ring also has advantages in flow line placement. FIG. 9 schematically depicts a ring of extraction chambers, here where m=4. m can be any number.

FIG. 10 schematically depicts prior art of leaching soil, sediments, and debris in which the solvent is pumped (either upwards or downwards) through the solids in a cylindrical container, 29. The shape of the container is used so that there is uniform drag on the edges of the container, reducing areas where the solvent does not flow (No Flow Zones) 32. Regardless of the cylindrical container, No Flow Zones still exist because of channeling in the solids. Once a channel forms, it is the preferred path of the solvent, and no amount of solvent pumping or time eliminates the No Flow Zones. These Zones stay contaminated because the contaminated solvent never drains away from the soil.

FIG. 11 schematically depicts the invention process, immersion and full drainage leaching. Note that any shape .container can be used, as long as it can hold the solvent and the solids. In fact, the process can even be done in-situ by the use of geologic controls such as clay lenses and man made barriers such as slurry walls. The solids are completely immersed by the solvent so that every solid particle is in contact with the solvent. Enough time must be allowed to put the contaminants in solution. As discussed earlier, the time to dissolve the contaminants will vary tremendously, and can usually be determined through treatability studies.

After the contaminants have dissolved in the solvent, the solids are drained. This removes the contaminated solvent from each solid particle, and there are no "No Flow Zones". Channels do form in the solids, but as the channels empty, they are filled by the lower permeability areas that form dendritic drainage paths into the channels. In this manner the effect of the channels on cleaning all of the solids is eliminated.

The immersion/full drainage process has other advantages as described herein, including the fact that oversized material need not be separated from the bulk of the solids prior to processing. If the object can fit in the extraction vessel, then it can be treated with all the other solids. At the other end of the size scale, fines are not mobilized to any great degree because of the low velocity of drainage, and the other solids act as a filter to retain the fines. The small amount of fines that do mobilize with the solvent leachate are either trapped in the sand above the filter 2, at the filter 3, or are removed outside of the extraction vessel 10.

FIG. 12 schematically depicts a process similar to the one shown in FIG. 1, except the basal filter is not present. This filter is not necessary when the solids have few fines, or when the treatment capacity of the Settling Vessel or Filter Station is increased.

FIG. 13 schematically depicts a process similar to the one shown in FIG. 1, except that the settling vessel or filter station is not necessary. This would occur when the solids have few fines, if the fines do not need treatment, or when the basal filter is sufficient for fines retention.

An important operational factor mentioned throughout this invention description has been that the system is adaptable to a wide range of site conditions. The above preferred embodiments can be used interchangeably with one another to create the system for maximum efficiency at an individual site.

SUMMARY, RAMIFICATIONS, AND SCOPE

Accordingly, the reader will see that the process for leaching hazardous, toxic, and radioactive wastes from soils, sediments and debris of this invention can be used to reduce contaminants in soils, sediments and debris to very low levels. Channeling of the solvent is no longer a concern in this process.

Further advantages include:

The process is very cost effective, because capital equipment costs are reduced by not needing mixing equipment or sophisticated solid/liquid separation equipment. Operational costs are reduced because there is no energy needed to mix the solvent and solids, and because the soils, sediments and debris are not moved within the system, but remain stationary. Maintenance costs are reduced because there are fewer moving parts than current systems. Transportation costs are reduced because there is less equipment, and the vessels to hold the soils, sediments and debris do not need to be a specific shape, but can be an easily transported shape.

The process is near silent because of the lack of moving parts, so that it can be used effectively in populated areas.

"Edge effects" of non-cylindrical containers are eliminated.

Oversized material can easily be processed by this method. In tests for the U.S. EPA, debris up to 30 centimeters was processed without special material handling.

Fine solids in the solvent extract are greatly reduced because the soil, sediment, and debris acts as an internal filter to trap these fines. Fines are also reduced because of the lack of agitation.

The process reduces the amount of solvent necessary for processing the soil because the soil and solvent separation is more complete than other methods.

"Hot Spots" in soils are leached as effectively as non-hotspots.

Any level of contamination can be reduced to any target level by adjusting the number of cycles that the soils, sediments, and debris are contacted by the solvent.

Monitoring of the contaminant levels in the soil is performed easily by monitoring the extracted solvent.

Additional cycles of immersion and drainage are inexpensive because no soil movement is necessary.

The option of desorption of the solvent in the same vessel as the extraction eliminates the need to move the soils, sediments, and debris. This option can also be used to control air emissions in sensitive areas.

The option of biodegradation of the residual solvent in the soils, sediments, and debris in the same vessel as the extraction eliminates the need to move the soils, sediments, and debris. This option can also be used to control air emissions in sensitive area.

The process allows easy upscale or downscale of vessel sizes and shapes so that each site to be processed can be maximized according to individual conditions.

Although the description above contains many specificities, these should not be construed as limiting the scope of the invention but as merely providing illustrations of some of the presently preferred embodiments of this invention. For example, instead of a vessel being used to contain the soils, sediments, and debris with the solvent, the materials could be processed in-situ with slurry walls and an impermeable geologic layer forming the container. Drainage would be removed with wells.

Thus the scope of the invention should be determined by the appended claims and their legal equivalents, rather than by the examples given.

I claim:

1. A process for treatment of contaminated soils, sediments, and debris for reducing the level of contaminants comprising:
   a. inserting contaminated soil, sediment, and debris in an extraction vessel;
   b. immersing completely the contaminated soil, sediment, and debris in a solvent;
   c. retaining the soils, sediment, debris and solvent in the extraction vessel for a predetermined period of time to dissolve contaminants and to suspend soil fines, thereby forming a leachate;
   d. filtering the contaminated leachate to separate the soils, sediment, and debris from the contaminated leachate and fines;
   e. draining completely the contaminated leachate and fines from the extraction vessel into a settling vessel;
   f. removing the suspended fines from the contaminated leachate in the settling vessel;
   g. transferring the remainder of the chemical leachate to a solvent purification station;
   h. purifying the chemical leachate in the purification station to obtain a cleaned solvent;
   i. returning the cleaned solvent to the extraction chamber for the continued use of the solvent.

2. The process in claim 1 wherein the draining of the contaminated leachate is from an opening in the bottom of the extraction vessel.

3. The process of claim 1 wherein the filtering is within the extraction vessel.

4. The process in claim 1 further including collecting the filtered contaminanted leachate and fines in a chamber within the extraction vessel.

5. The process in claim 1 further including venting the extraction vessel to collect vapors.

6. The process in claim 1 further including pulling a vacuum to remove volatile vapors from the soil, sediments and debris in the extraction vessel.

7. The process in claim 6 further including collecting the volatile vapors.

8. The process in claim 1 further including injecting steam into the soils, sediments, and debris in the extraction vessel.

9. The process in claim 1 further including heating the soils, sediments and debris in the extraction vessel.

10. The process in claim 1 further including introducing solvent consuming microbes and nutrients into the extraction vessel.

11. The process in claim 1 further including injecting non-flammable gas into said soils, sediments, and debris in the extraction vessel.

12. The process in claim 1 further including covering the extraction vessel thereby reducing vapor loss or introduction of unwanted materials.

13. The process in claim 1 further including arraigning a plurality of extraction vessels in series.

14. The process in claim 1 wherein the contaminants are organic chemicals.

15. The process in claim 1 wherein the contaminants are metals.

16. The process in claim 1 wherein the contaminants are radioactive.

17. The process in claim 1 wherein the fines are removed from the fluids in the settling tank through normal settling.

18. The process in claim 1 wherein the fines are removed from the fluids in the settling tank through filtration.

19. The process in claim 1 wherein the fines are removed from the fluids in the settling tank through resuspension and flocculation.

* * * * *